United States Patent Office 2,841,557
Patented July 1, 1958

2,841,557
LITHIUM SOAP GREASE AND PROCESS OF MAKING SAME

John Walter Nelson, Lansing, Ill., assignor to Sinclair Refining Company, New York, N. Y., a corporation of Maine No Drawing. Application January 24, 1956
Serial No. 561,137

6 Claims. (Cl. 252—41)

My invention relates to the manufacture of lithium greases.

It is now well established that lithium greases, that is, greases in which the gelling agent is a lithium soap, have particular value as all purpose greases and lubricants. These greases are in good demand, despite the relatively higher cost of the soap ingredients, as compared with conventional sodium and calcium greases. Heretofore, it has been proposed to prepare lithium greases by a procedure involving heating a mixture of mineral oil, an aqueous solution of lithium base such as lithium hydroxide monohydrate and fatty acid radical soap, such as hydrogenated castor oil, 12-hydroxystearic acid or lower alkyl ester of 12-hydroxystearic acid, until the desired soap has been formed and the reaction mixture has been dehydrated, and thereafter permitting the mixture to cool, additional oil being added to the reaction mixture during cooling, as necessary, to produce a final grease composition of the desired properties.

In accordance with my invention, I have discovered that lithium greases of excellent properties can be prepared using as a fatty acid radical source one or more alkyl epoxy acyloxy stearates wherein the alkyl and acyloxy radicals are lower ones, generally containing not more than 6 carbon atoms. These materials conform to the generic formula:

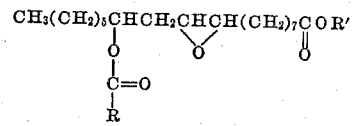

wherein R is a lower alkyl radical and R' is a lower alkyl radical. Generally, R will contain not more than 5 carbon atoms and R' will contain not more than 6 carbon atoms. Such materials can be prepared in accordance with procedures which are well known, for example, as described in the article published by Pigulevskii and Rostomyan in Zhur. Obschchei Khim. 22, 1987–8 (1952), and abstracted in Chemical Abstracts 47, 9261 (1953). The procedure generally involves acylation of the appropriate ricinoleate followed by epoxidation of the acylated ester with peracetic acid. As the acylating agent there can be employed, for example, acetic anhydride, propionic anhydride, butyric anhydride and the like and as the ricinoleate there can be utilized, for example, methyl ricinoleate, ethyl ricinoleate, isopropyl ricinoleate, isobutyl ricinoleate, and so forth.

In preparing the lithium greases in accordance with my invention, the methods which have heretofore been used in saponifying soap-forming ingredients are not generally applicable. Particular reaction procedures must be employed, if an acceptable grease is to be obtained. Thus, the stearate utilized as a starting material is exceptionally difficult to saponify, but I have discovered that this can be satisfactorily accomplished provided that there is included in the reaction mixture approximately two moles of lithium base per mole of stearate and at least 15 moles of water per mole of lithium base. Generally from 1.75 to 2.25 moles of lithium base are used per mole of stearate in the reaction mixture and any of the lithium bases conventionally employed in the manufacture of lithium base greases can be used in the practice of my invention, for example, anhydrous lithium hydroxide, lithium hydroxide monohydrate, lithium carbonate, and the like. Preferably, from 20 to 100 moles of water per mole of lithium base will be introduced into the reaction mixture from which the final grease composition is made.

In practicing my invention, the reaction mixture is heated to a temperature which is sufficient to form the desired soap and at the same time dehydrate the mixture. In doing this, I prefer to employ a maximum temperature not exceeding about 350° F., although somewhat higher temperatures, for example 400° F., can be utilized, if desired. After this has been accomplished, the reaction mixture is permitted to cool, with additional oil being added or not added, depending upon the consistency desired in the final grease composition. Conventional grease additives can also be included to enhance the properties of the grease, among them being corrosion inhibitors, extreme pressure additives, anti-wear agents, stabilizers and anti-oxidants such as phenylene diamine, Hyamine B and octylated aryl alkylated diphenylamine.

The following example illustrates a specific embodiment falling within the scope of my invention and is to be considered not limitative.

Example

A grease kettle was charged with two pounds of isobutyl epoxy acetoxy stearate and 6 pounds of a conventionally refined Gulf Coast or primarily naphthenic mineral oil having a viscosity of 300 SUV at 100° F. The kettle contents were heated to 200° F. and a boiling solution consisting of 0.42 pound of lithium hydroxide monohydrate in one quart of water was then added. The mixture was stirred while applying heat to the kettle for about 30 minutes and then ½ quart of water was added. After two hours, the temperature had reached 200° F. Another quart of water was then added. Two hours later a gel had formed and more heat was applied to complete the dehydration. After 1½ hours the temperature had reached 340° F. At this point, the heat was turned off and the grease was allowed to cool with stirring. After it had cooled to 190° F., it was milled in a Charlotte colloid mill set at 0.005 inch clearance. A hard grease resulted. The analytical data of this grease are set forth below:

ASTM penetration, unworked _____ 194
ASTM penetration—
    After 60 strokes _____ 215
    After 5000 strokes _____ 246
    After 10,000 strokes _____ 259
    After 100,000 strokes _____ 286
100M strokes penetration minus 60 strokes penetration, +71
100M strokes penetration when admixed with 10% by weight of water minus 60 strokes penetration, +42
Dropping point, ° F. _____ 406
Free alkali (weight percent LiOH) _____ 0.06
250° F. 6 hour wheel bearing test _____ Pass and good The above data show good shear stability, excellent water stability, high dropping point and excellent wheel bearing performance.

I claim:

1. In the manufacture of lithium greases, the method which comprises heating a mixture of a lithium base, an alkyl epoxy acyloxy stearate of the formula:

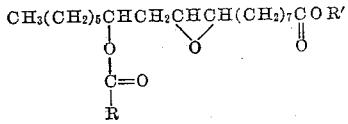

water and mineral oil to a temperature sufficient to form a soap and dehydrate the mixture, said mixture comprising approximately two moles of lithium base per mole of said stearate and at least 15 moles of $H_2O$ per mole of lithium base and the amounts of lithium base and said stearate employed being sufficient to form a grease upon subsequent cooling of the mixture, R being a lower alkyl radical and R' being a lower alkyl radical.

2. The method of claim 1 wherein R contains not more than 5 carbon atoms and R' contains not more than 6 carbon atoms and wherein the amount of water per mole of lithium base is within the range from 20 to 100 moles.

3. In the manufacture of lithium greases, the method which comprises heating a mixture of a lithium base, isobutyl epoxy acetoxy stearate of the formula:

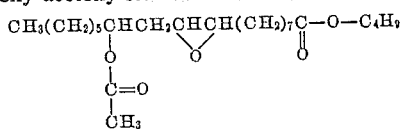

water and mineral oil to a temperature sufficient to form a soap and dehydrate the mixture, said mixture comprising approximately two moles of lithium base per mole of said stearate and at least 15 moles of $H_2O$ per mole of lithium base and the amounts of lithium base and said stearate employed being sufficient to form a grease upon subsequent cooling of the mixture.

4. The method of claim 3 wherein said lithium base is lithium hydroxide monohydrate and wherein the amount of water per mole of lithium hydroxide monohydrate is within the range from 20 to 100 moles.

5. A lithium grease produced by the process of claim 1.

6. A lithium grease produced by the process of claim 4.

References Cited in the file of this patent

UNITED STATES PATENTS 2,380,960     Fraser _____ Aug. 7, 1945
2,712,527     Mikeska et al. _____ July 5, 1955